US005250134A

United States Patent [19]

Thomas et al.

[11] Patent Number: 5,250,134

[45] Date of Patent: Oct. 5, 1993

[54] SYSTEM AND METHOD FOR FORMING AN OVERWRAP WEB PROVIDED WITH INSERTS

[75] Inventors: David A. Thomas, Beverly; Robert M. O'Connell, Belle Mead; Robert C. Reinert, Mount Laurel, all of N.J.; John M. Gillin, Huntington Valley, Pa.

[73] Assignee: Philip Morris, Inc., New York, N.Y.

[21] Appl. No.: 664,878

[22] Filed: Mar. 5, 1991

Related U.S. Application Data

[62] Division of Ser. No. 299,053, Jan. 19, 1989, Pat. No. 5,035,935.

[51] Int. Cl.⁵ ............................................ B32B 31/00

[52] U.S. Cl. .................................. 156/264; 156/250; 156/251; 156/271; 156/277; 156/516; 156/552; 156/557; 156/461; 83/84; 83/279; 206/242

[58] Field of Search ............... 156/540, 557, 559, 271, 156/277, 251, 250, DIG. 33, DIG. 44, DIG. 50, 200, 201, 461, 247, 249, 268, 264, 265, 552, 516, 519; 206/242; 83/84, 255, 279

[56] References Cited

U.S. PATENT DOCUMENTS

| | | | |
|---|---|---|---|
| 3,159,521 | 12/1964 | Pechmann | 156/DIG. 33 |
| 3,988,194 | 10/1976 | Babcock et al. | 156/519 |
| 4,012,268 | 3/1977 | Johnsen | 156/204 |
| 4,171,239 | 10/1979 | Hirsch et al. | 156/519 |
| 4,664,416 | 5/1987 | Steidinger | 156/519 |
| 4,680,080 | 7/1987 | Instance | 156/552 |
| 4,888,078 | 12/1989 | Instance | 156/552 |
| 4,894,106 | 1/1991 | Instance | 156/516 |
| 5,021,273 | 6/1991 | Kobayashi | 156/204 |

*Primary Examiner*—Patrick J. Ryan
*Assistant Examiner*—Merrick Dixon
*Attorney, Agent, or Firm*—Ostrolenk, Faber, Gerb & Soffen

[57] ABSTRACT

Paper stock is unwound, printed, folded, laminated and cut to form inserts. The laminated inserts are applied to an overwrap at an appropriately spaced interval. The resultant overwrap can then be wrapped around cigarette packs to provide each pack with an insert without slowing down production.

12 Claims, 7 Drawing Sheets

SYSTEM AND METHOD FOR FORMING AN OVERWRAP WEB PROVIDED WITH INSERTS

This is a division of application Ser. No. 07/299,053, filed Jan. 19, 1989, now U.S. Pat. No. 5,135,935.

BACKGROUND OF THE INVENTION

Cigarettes are conventionally packaged in a printed opaque pack. The printed pack is conventionally neatly wrapped and sealed within a transparent polypropylene film overwrap. The film overwrap conventionally includes a tear strip for ready removal of the overwrap.

Recently, it has become desirable to provide a coupon or other type of advertising literature with individual cigarette packs. Indeed, a law has been passed in Canada which will require a literature insert on health issues to be provided to consumers with every pack of cigarettes.

In the past, printed material has been affixed to the outside of the overwrap with a pressure sensitive adhesive. However, this has proven to be disadvantageous because the printed material often becomes removed or separated prior to sale to a consumer. In particular, rebate coupons have been removed and cashed prior to sale.

Another known technique is to place the printed material directly on the printed pack and then subsequently wrap the transparent overwrap over both the pack and the printed material. However, this method has proven to be disadvantageously slow because it requires the use of pick-and-place equipment which cannot keep pace with industry objectives. Current machinery can seal cigarette packages with overwrap (but without a separate printed material insert) at a rate of about 360 packs per minute. It is expected that, within two years, packaging equipment will be able to efficiently produce 700 packs per minute. However, presently available pick-and-place equipment can produce sealed packs of cigarettes with inserts at a rate no faster than about 260 packs per minute.

OBJECTS OF THE INVENTION

Accordingly, one object of the present invention is to facilitate the production of cigarettes packaged with literature inserts.

Another object of the present invention to provide packs of cigarettes sealed with overwrap and containing a printed insert which: (1) cannot be removed from the packs without removing the overwrap and (2) can be more efficiently manufactured than has been possible in the prior art.

SUMMARY OF THE INVENTION

The present invention overcomes the above-noted problems of the prior art and achieves the above-identified objects by adhering an insert to an overwrap web prior to packaging. The overwrap can then be wrapped around cigarette packs in the ordinary manner without slowing down production.

The present invention includes an apparatus for forming an overwrap web provided with inserts. The apparatus includes means for forming inserts which are spaced from one another. The forming means includes means for cutting inserts out of a sandwiched structure. The apparatus includes first means for advancing the inserts in a first direction. The apparatus includes second means for advancing the overwrap in a second direction. The apparatus further includes means for applying the inserts onto the overwrap to form the overwrap web provided with inserts, which can then be used to wrap one or more packages with the inserts appropriately positioned with respect to the packages.

The present invention further includes a system which includes means for advancing wide paper in a first direction. The system further includes means for forming the wide paper into first and second lengths of narrow paper. The system further includes first and second folding means for continuously folding the first and second lengths, respectively. The system further includes first and second cutting means for cutting inserts out of the first and second lengths. The first and second cutting means are adapted to operate independently of each other.

Other features and objects of the present invention will become apparent from the following description of a preferred embodiment of the invention considered in conjunction with the accompanying drawings.

DETAILED DESCRIPTION OF THE PREFERRED EMBODIMENT

1. Introduction

Briefly, the invention involves a system in which a piece of paper is printed, folded approximately into thirds and cut to form an insert, the insert is laminated with a layer of film with perforations to allow for its removal, and the laminated insert is applied to an overwrap material at appropriately spaced intervals. The finished product is then rolled up for delivery to a manufacturer. The manufacturer unwinds the finished product and wraps it around a cigarette pack to seal the pack.

2. Paper Handling and Printing Sub-System

Figure 1:
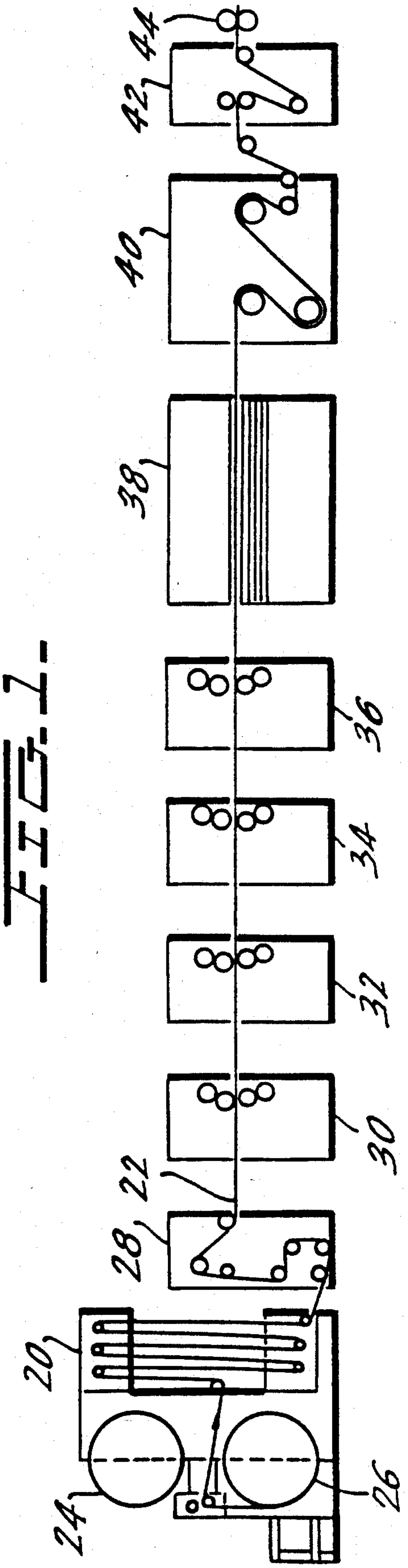
FIG. 1 is a schematic view of a paper handling and printing subsystem of a preferred embodiment of the invention.

Referring first to FIG. 1, in the preferred embodiment, a zero speed flying splice infeed apparatus 20 is used to feed paper 22 alternately from rolls 24, 26 without interruption. An edge guide and tension control apparatus 28 is arranged downstream (from left to right as viewed in FIG. 1) from the zero speed flying splice infeed apparatus 20 followed by rotary printers 30–36, a dryer 38, a chill unit 40, a web reconditioning unit 42, and a rotary slitter 44.

In operation, a 26 inch (about 66 centimeters) wide continuous sheet of paper 22 is unwound from one of the two rolls 24, 26 and directed through the zero speed flying splice infeed apparatus 20 toward the edge guide and tension control apparatus 28. Paper 22 is preferably a high-quality lithographic sheet, coated on both sides. When paper 22 on one of the rolls 24 or 26 is depleted, the zero speed flying splice infeed apparatus 20 splices the alternate roll of paper 24 or 26 to the roll 24 or 26 currently feeding the printers 30–36 allowing the depleted roll 24 or 26 to be replaced and the replacement roll 24 or 26 to be readied for the next changeover without interruption. The edge guide and tension control apparatus 28 continuously guides the edges and controls the tension of the continuously fed paper 22. The paper 22 is then directed to the printers 30–36 where the paper 22 is printed with ink (in color if desired) using a rotary offset or other printing technique. The paper 22 is then continuously fed to the dryer 38 where the temperature of the paper 22 is increased to set the ink. The paper 22 is then continuously fed to the chill unit 40, where the temperature of the paper 22 is reduced. The paper 22 is then continuously fed to the web reconditioning unit 42 where moisture is restored to the paper 22. The paper 22 is then continuously fed to the rotary slitter 44 where the 26 inch (about 66 centimeters) wide paper 22 is continuously, longitudinally slit into four $6\frac{1}{2}$ inch (about 16.5 centimeters) wide continuous lengths or runs of paper 46–52. Each of the four lengths of paper 46–52 is then handled separately and independently from the others.

3. Folding Subsystem

Figure 2:
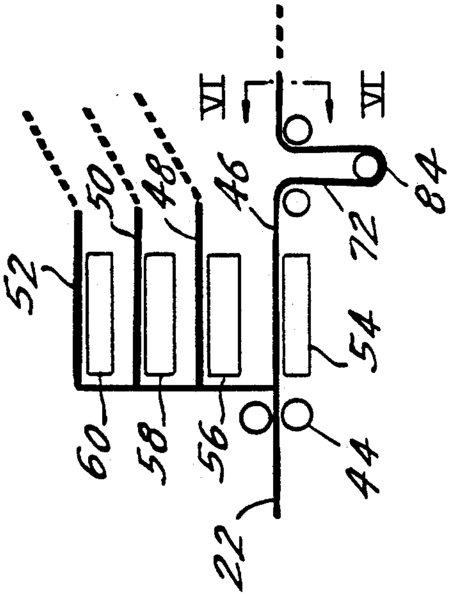
FIG. 2 is a schematic view of a folding subsystem of the preferred embodiment.

Referring now to FIG. 2, each of the four lengths or runs of printed and slit paper 46–52 is tri-folded by respective plow prefolding units 54–60.

Figure 3:
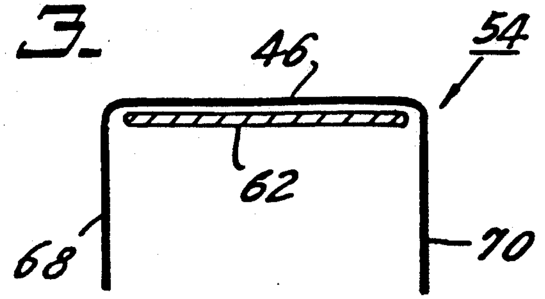
FIG. 3 is a first cross-sectional view through a plow of the preferred embodiment.
Figure 4:
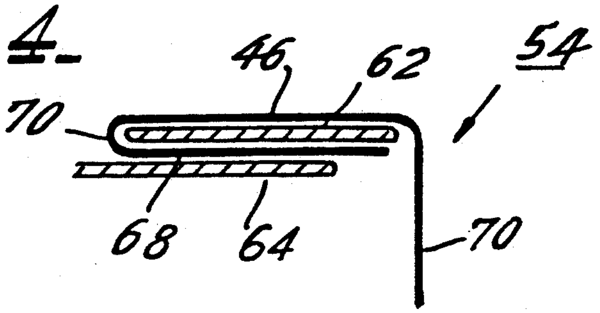
FIG. 4 is a second cross-sectional view through the plow of the preferred embodiment.
Figure 5:
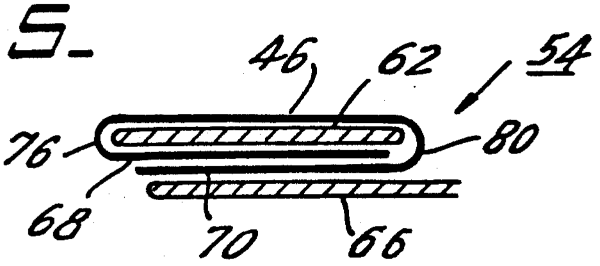
FIG. 5 is a third cross-sectional view through the plow of the preferred embodiment.

One of the plow prefolding units 54 is illustrated in detail in FIGS. 3-5. The plow prefolding unit 54 includes a metal plow 62, a first finger 64 located along the length of the metal plow 62 and beneath the metal plow 62, and a second finger 66 located downstream from the first finger 64 and beneath the metal plow 62.

In operation, one of the runs of paper 46 is continuously fed over and along the length of the metal plow 62. The opposite longitudinal edges 68, 70 of the paper 46 are drawn downwardly as shown in FIG. 3. As the paper 46 is fed over and along the metal plow 62, the first longitudinal edge 68 is folded to the right (as illustrated in FIG. 4) by the first finger 64. Then, further on, as the paper 46 i fed over and along the metal plow 62, the second longitudinal edge 70 is folded by the second finger 66 into an overlapping position. Thus, the plow prefolding unit 54 serves to tri-fold paper 46 into a continuously folded and overlapped length or run of paper 72 (FIG. 6).

Figure 6:
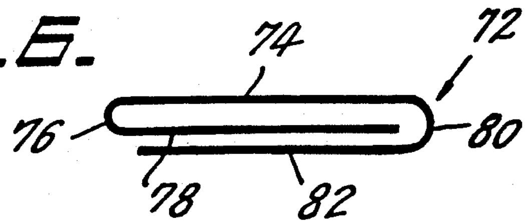
FIG. 6 is a cross-sectional view through the line VI—VI of FIG. 2.

Referring now to FIG. 6, the folded paper 72 includes an upper portion 74 which is about $2\frac{1}{2}$ inches (about 6.4 cm) wide, a first fold 76, a first folded portion 78 which is almost as wide as the upper portion 74, a second fold 80, and a second folded portion 82 which is almost as wide as the upper portion 74. For the sake of clarity, the drawings are not to scale. The folds 76, 80 are actually sharp and the portions 78, 82 are tightly and neatly folded against the upper portion 74 as the folded and overlapped paper 72 is continuously fed away from the plow prefolding unit 54. The paper 72 need not necessarily be folded in thirds. Other folding patterns may be deemed desirable.

4. Insert Formation and Application Sub-System

Figure 8:
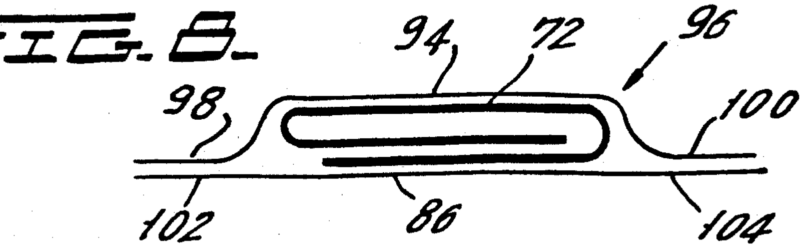
FIG. 8 is a cross-sectional view through the line VIII—VIII of FIG. 7.
Figure 7:
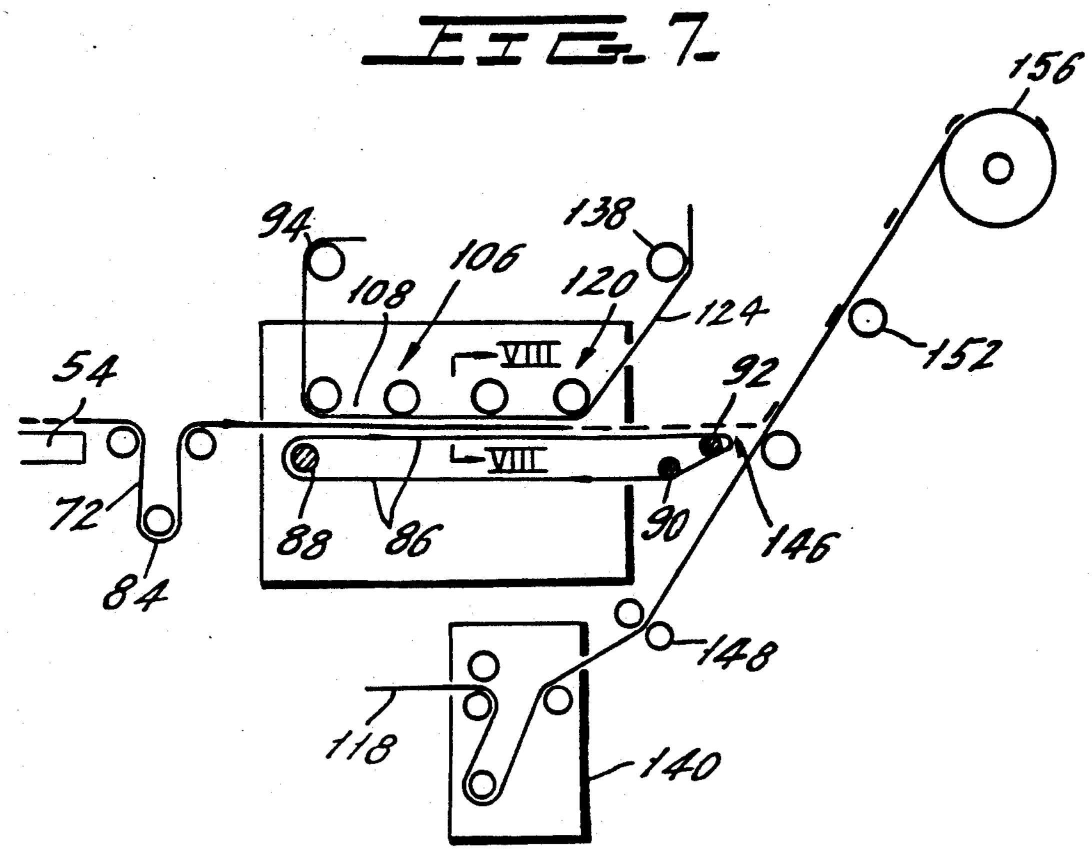
FIG. 7 is a schematic view of an insert formation and application subsystem of the preferred embodiment.

Referring now to FIG. 7, each folded run of paper 72 is continuously fed from its respective plow pre-folding unit 54, past a means 84 for guiding the edges and controlling the tension of the paper 72 and then onto a continuous release belt 86. The continuous release belt 86 is formed from polypropylene or other suitable material. The continuous release belt 86 revolves clockwise around a suitable supporting means illustrated schematically at 88–92. A pressure-sensitive overlaminate 94 is applied over paper 72., as shown in FIG. 8. The overlaminate 94 is preferably formed of polypropylene, although MYLAR®, polyethylene or other suitable material could be used.

In operation, paper 72 is advanced toward the continuous release belt 86 and supported thereon as the paper 72 and the continuous release belt 86 move together from left to right (as illustrated in FIG. 7). The overlaminate 94 is brought downwardly over paper 72 to sandwich paper 72 between the overlaminate 94 and the continuous release belt 86. The resulting sandwiched structure 96 is illustrated in cross-section in FIG. 8. The overlaminate 94 includes a first edge portion 98 and a second edge portion 100. The first edge portion 98 and the second edge portion 100 are, respectively, releasably bonded to a first longitudinal region 102 and a second longitudinal region 104 of the continuous release belt 86. The overlaminate 94 is also releasably bonded to paper 72.

Figure 9:
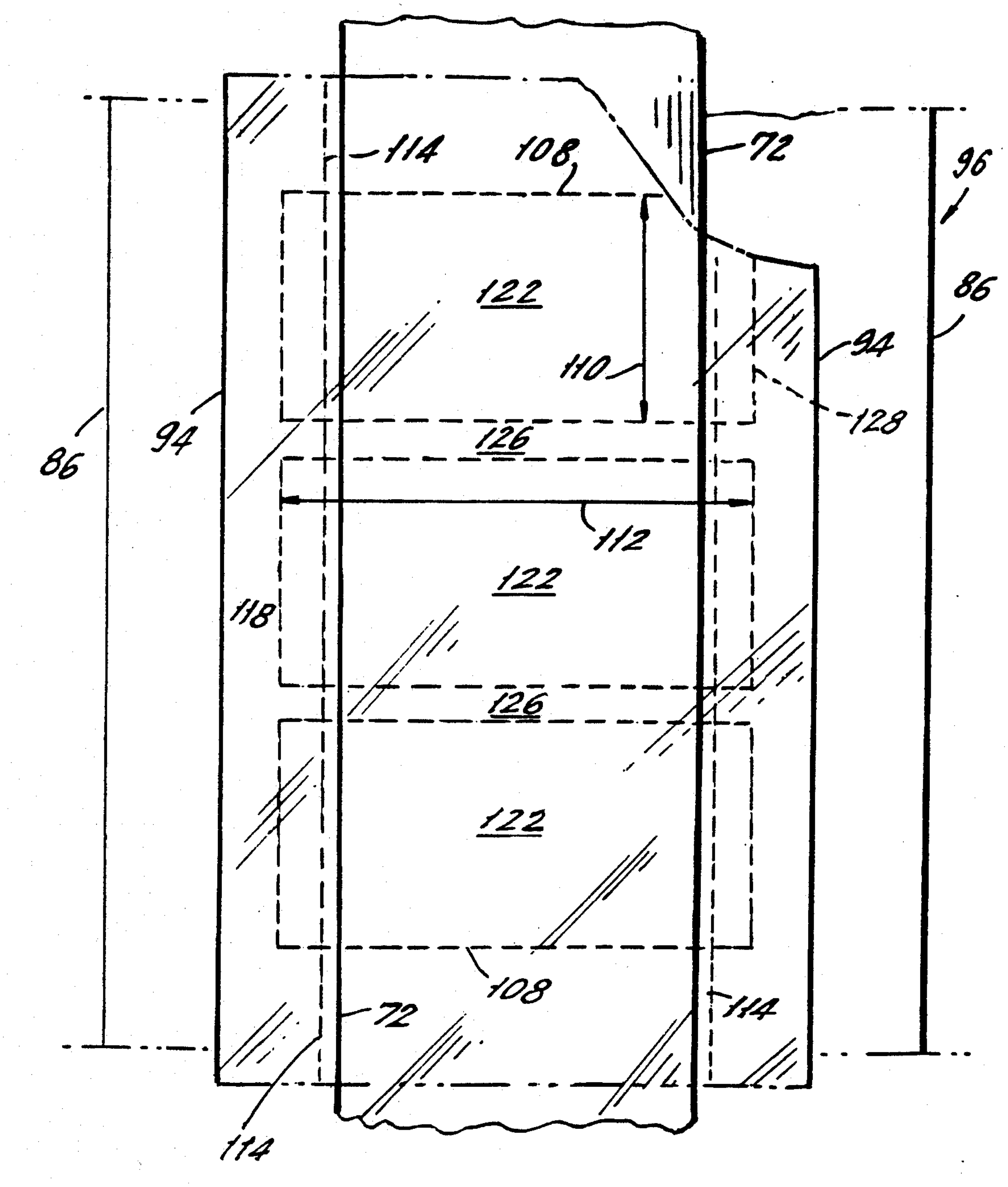
FIG. 9 is a partial plan view of a sandwiched structure formed in accordance with the preferred embodiment.

The sandwiched structure 96, is then fed continuously to rotary die cutters 106 (FIG. 7). The rotary die cutters 106 form generally rectangular cuts 108 through the overlaminate 94 and paper 72. The cuts 108 are illustrated in FIG. 9 as dashed, generally rectangular lines. The cuts 108 have a dimension indicated at 110 which is about $1\frac{3}{4}$ inches (about 4.4 cm) long. The cuts 108 have a dimension indicated at 112 which is about $2\frac{3}{4}$ inches (about 7 cm) wide. Longitudinally directed perforations 114 are also cut through overlaminate 94. These perforations 114 facilitate the removal of a literature insert 116 from the film overwrap 118 by a consumer.

The rotary die cutters 106 are controlled by signals from an electronic eye illustrated schematically at 120. The electronic eye 120 is responsive to the presence of printed material 122 or other means on paper 72. The electronic eye 120 and the die cutters 106 cooperate to ensure the cuts 108 are properly centered and located with respect to the printed material 122 on paper 72 so as to surround the printed material 122 properly.

Figure 10:
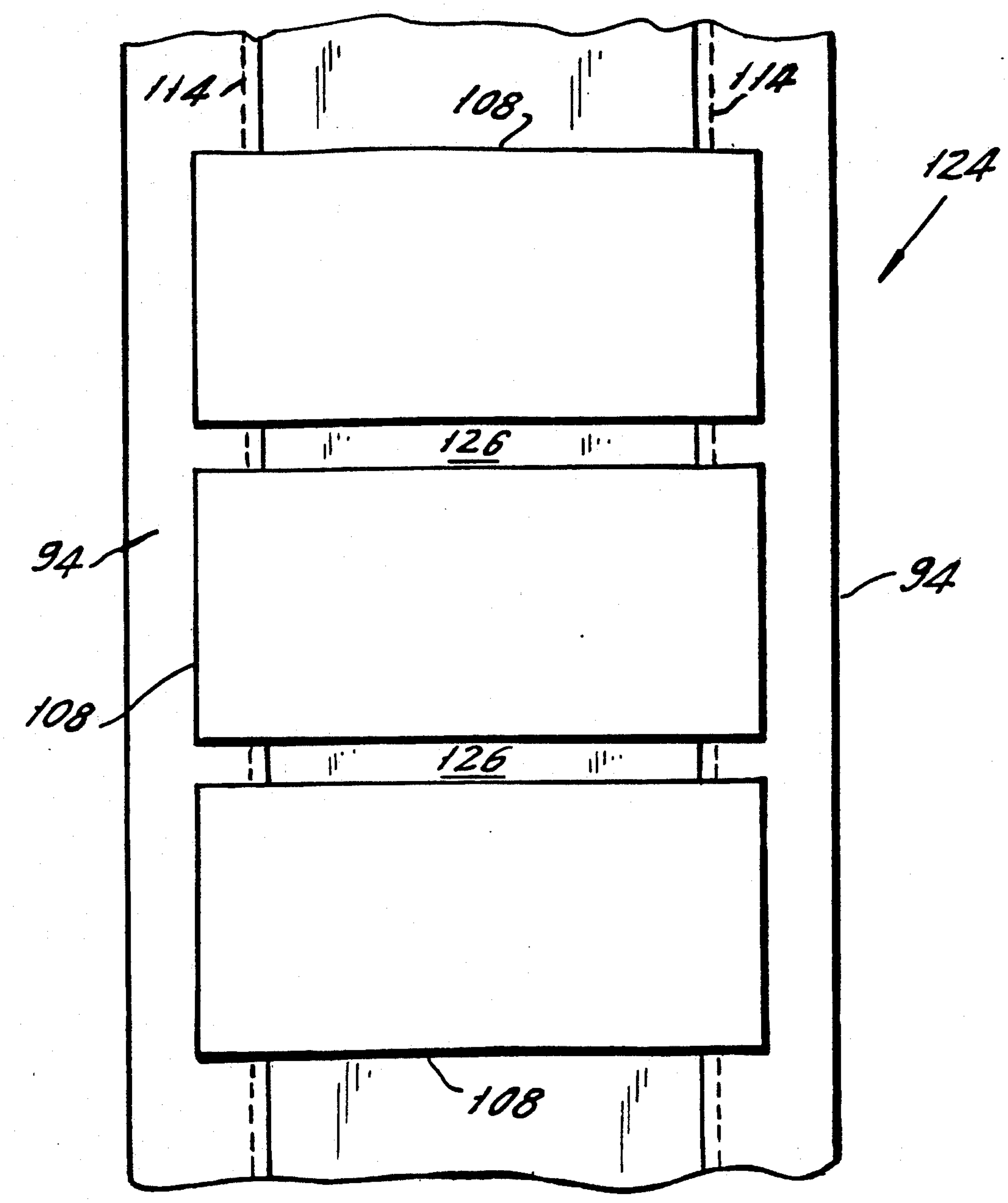
FIG. 10 is a partial plan view of a ladder shaped matrix formed in accordance with the preferred embodiment.
Figure 11:
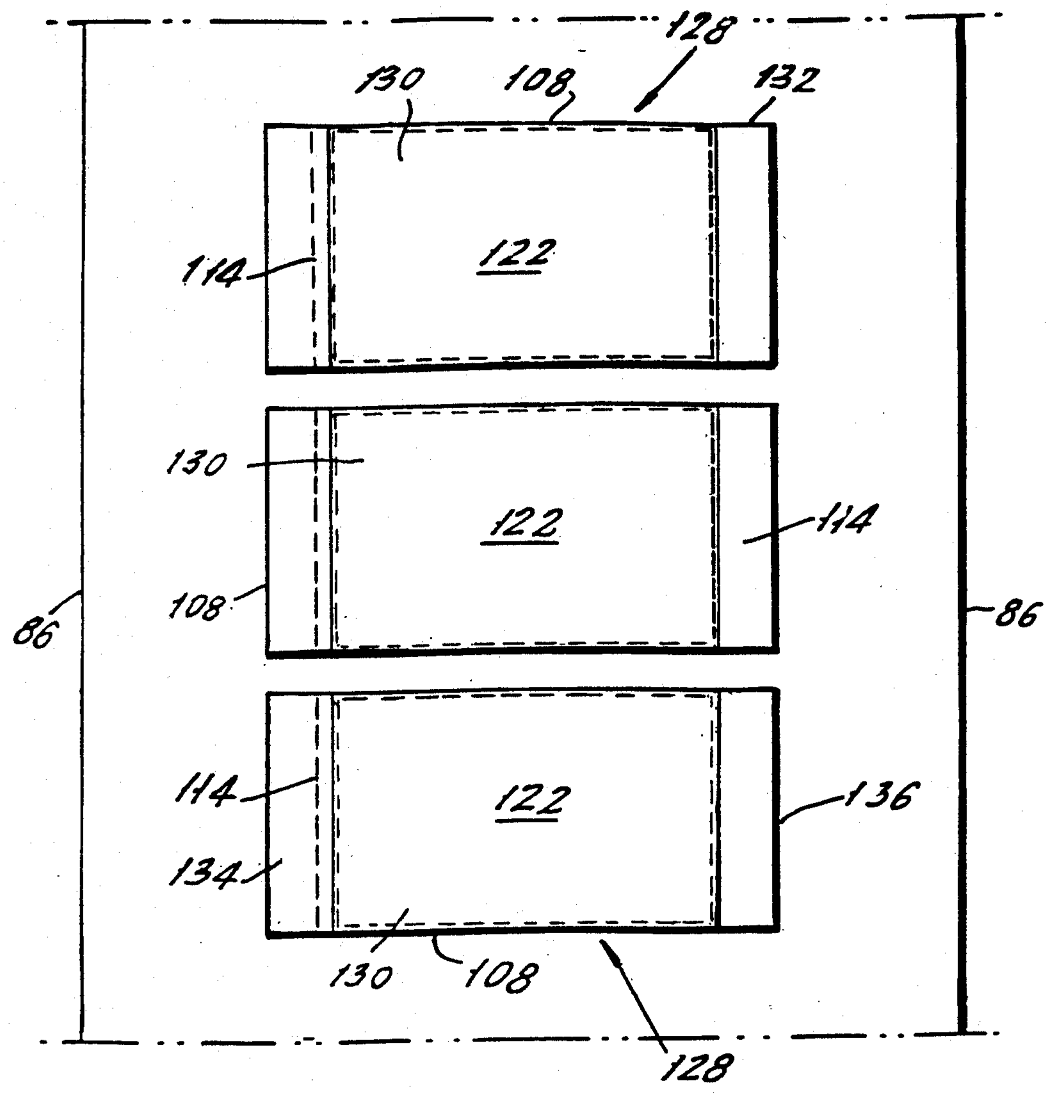
FIG. 11 is a partial plan view of a continuous release belt with inserts formed thereon in accordance with the preferred embodiment.

The cuts 108 define a ladder-shaped matrix 124 (FIG. 10) with the overlaminate 94 bonded to slits 126 of folded paper. The slits 126 are arranged as rungs of the ladder-shaped matrix 124. The cuts 108 further define rectangularly shaped pieces 128 (FIG. 11). Each of the pieces 128 includes a rectangular insert 130 of folded paper covered by a slightly wider rectangular piece 132 of the overlaminate 94. Ends 134 and 136 of each rectangular piece 128 remain adhered to the continuous release belt 86.

The sandwiched structure 96 is then continuously fed to matrix stripper 138. The matrix stripper 138 operates to remove the ladder-shaped matrix 124 upwardly and away from the continuous release belt 86. The spaced inserts 130, with the rectangular pieces 132 laminated thereto, are advanced forwardly by the clockwise rotation of the continuous release belt 86.

Figure 13:
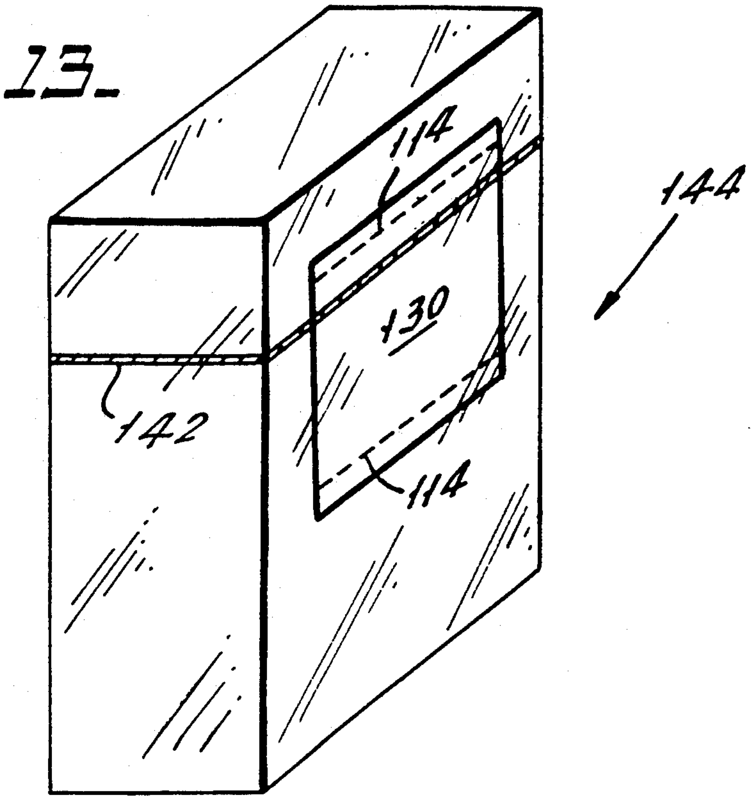
FIG. 13 is an isometric view of a pack of cigarettes wrapped with the finished product of the preferred embodiment.
Figure 12:
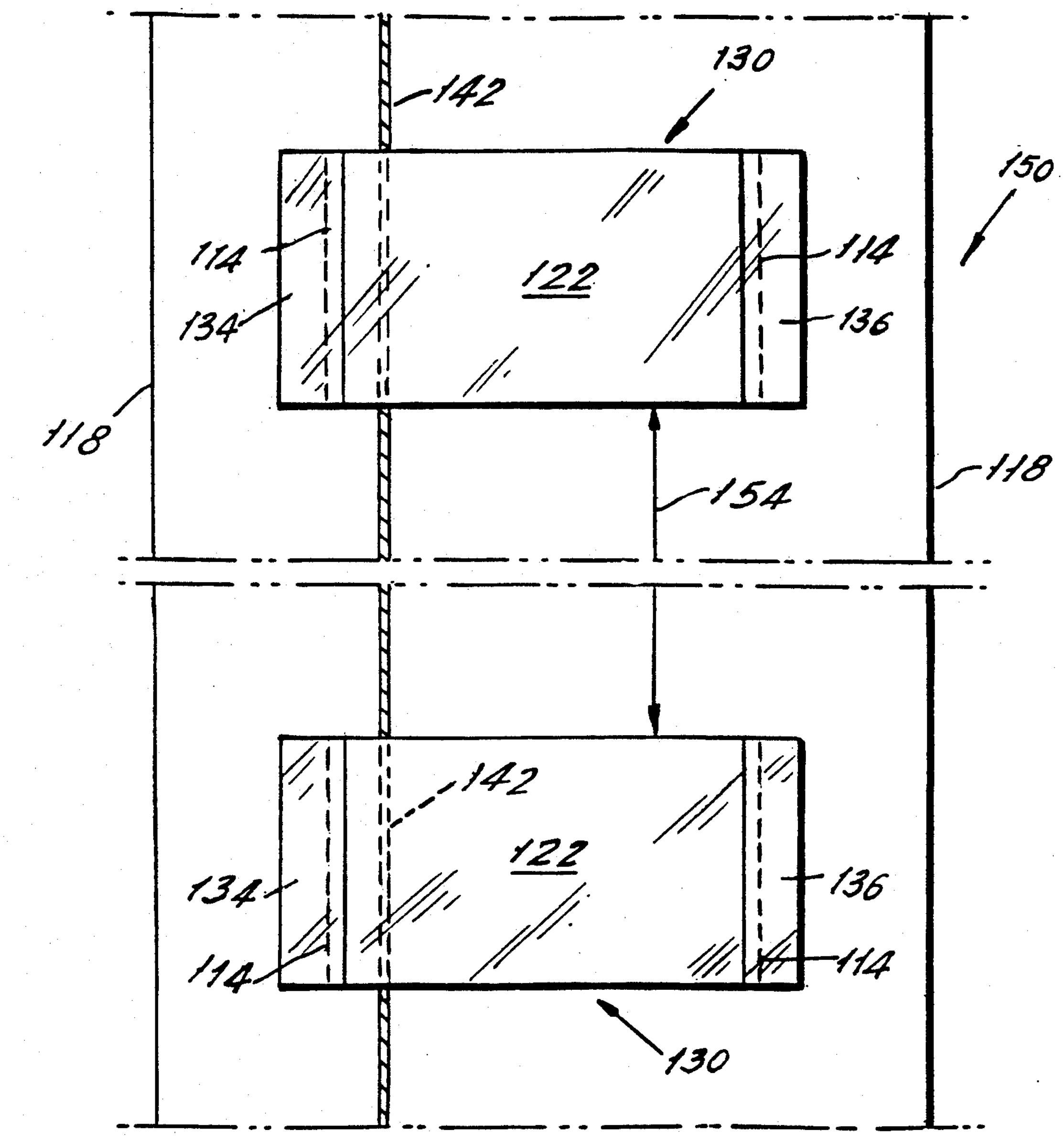
FIG. 12 is a partial plan view of a finished product in accordance with the preferred embodiment.

Referring back now to FIG. 7, the transparent film overwrap 118 is independently unwound and advanced toward a tear tape laminator 140, where the overwrap 118 is laminated with polypropylene tear tape 142 (FIG. 12). The tear tape 142 is preferably painted so as to be easily visible by a consumer unwrapping a pack of cigarettes 144 (FIG. 13). The overwrap 118 is about 4½ inches (about 11.4 cm) wide. The overwrap 118 is advanced upwardly toward a peel tip 146 by means of an infeed nip 148.

In the vicinity of the peel tip 146, the laminated inserts 130 and the overwrap 118 are brought together to form a finished web 150 (FIG. 12). Specifically, the laminated inserts 130 are peeled away from the continuous release belt 86 by separating the ends 134 and 136 of the rectangular pieces 128 from the continuous release belt 86. As the continuous release belt 86 is advanced in a clockwise direction, each laminated insert 130 is peeled off the release belt 86 and onto the overwrap 118. The ends 134 and 136 then adhere to the overwrap 118 to form the finished web 150. The overwrap 118 travels faster than the continuous release belt 86 by appropriate operation of the infeed nip 148 and an outfeed nip 152. This speed of travel differential forms an appropriate spacing 154. In the preferred embodiment, this spacing 154 is about 4⅝ inches (about 12 cm). The finished web 150 is then directed past the outfeed nip 152 and around a rewind roll 156 of a turret outfeed mechanism to a predetermined roll size. The wound up finished web 150 is then available for use in producing packs of cigarettes 144.

The spacing 154 and the size of the inserts 130 are chosen so that the finished web 150 can be wrapped around cigarette packs 144 in the ordinary manner with an insert 130 being assembled with a respective pack 144 without slowing production. In the preferred embodiment, the inserts 130 are applied to the side of the overwrap 118 that will be facing inwardly toward the packs 144 so that each insert 130 is secured within the overwrap 118. This prevents removal of the insert 130 prior to sale. However, the inserts 130 can be assembled on the outside of the overwrap 118 if desired.

Although the present invention has been described in connection with a preferred embodiment thereof, many other variations and modifications may become apparent to those skilled in the art. It is preferred, therefore, that the present invention be limited not by the specific disclosure herein, but only by the appended claims.

What is claimed is:

1. An apparatus for forming an overwrap web provided with inserts, said apparatus comprising:

means for applying an overlaminate over pieces of spaced apart paper to form a sandwiched structure and means for cutting said formed inserts out of said sandwiched structure, said formed inserts each comprising one of said pieces of paper covered with a piece of said overlaminate, said inserts being spaced from one another;

first means for advancing said inserts in a first direction;

second means for advancing a film overwrap in a second direction;

means for assembling said inserts against said overwrap with an appropriate spacing between said inserts to form an overwrap web provided with inserts; and means for winding said overwrap web provided with said inserts into a roll, said roll being adapted to be used for wrapping a plurality of packages with said inserts appropriately positioned with respect to said packages.

2. The apparatus of claim 1, wherein said forming means further includes:

advancing means for continuously advancing said pieces of paper in said first direction, said paper having printed material thereon, said paper being longitudinally, continuously folded;

a rotatable, continuous release belt;

means for directing said overlaminate toward said paper and means for sandwiching said paper between said overlaminate and said belt to form said sandwiched structure;

an electronic eye, said eye being responsive to said printed material and a rotary die cutter for cutting said inserts out of said sandwiched structure, said rotary die cutter being responsive to said electronic eye.

3. The apparatus of claim 1, wherein said assembling means includes:

means for continuously advancing said sandwiched structure in said first direction at a first rate of speed, said sandwiched structure comprising a continuous release belt, folded said pieces of paper and said overlaminate, said continuous release belt including a pressure-sensitive adhesive, said paper being adhered to said adhesive, said overlaminate being adhered to said folded paper and to said adhesive, said sandwiched structure including a first portion and a ladder-shaped matrix, said first portion including said inserts and rectangular pieces of said overlaminate, said ladder-shaped matrix being formed of said overlaminate and said paper;

means for removing said matrix from said inserts;

means for removing said inserts from said belt;

means for transferring said inserts to said overwrap and means for adhering said inserts to said overwrap;

wherein said second advancing means includes means for advancing said overwrap in said second direction at a second rate of speed, said second rate of speed being faster than said first rate of speed.

4. The apparatus of claim 1, wherein the means for forming inserts further comprises means for advancing wide paper in the first direction; means for forming said wide paper into a first length of narrow paper and a second length of narrow paper; and first folding means for continuously folding said first length and second folding means for continuously folding said second length.

5. The apparatus of claim 4, wherein said first folding means includes means for tri-folding said first length, means for guiding the edge of said first length and means for controlling the tension of said first length.

6. The apparatus of claim 4, wherein said first length has printed material thereon, said first length being longitudinally, continuously folded and said advancing means includes a rotatable, continuous release belt.

7. A method of forming an overwrap web provided with inserts, said method comprising the steps of:

forming inserts, said step of forming inserts including applying an overlaminate over spaced apart pieces of paper to form a sandwiched structure and cutting said formed inserts out of said sandwiched structure, said formed inserts each comprising one of said pieces of paper covered with a piece of said overlaminate, said inserts being spaced from one another;

advancing said inserts in a first direction;

advancing a film overwrap in a second direction;

assembling said inserts against said overwrap with an appropriate spacing between said inserts to form an overwrap web provided with inserts; and winding said overwrap web provided with said inserts into a roll, said roll being adapted to be used for wrapping a plurality of packages with said inserts appropriately positioned with respect to said packages.

8. The apparatus of claim 2, wherein said pieces of paper are folded in thirds.

9. The apparatus of claim 2, wherein said overlaminate has a width wider than a width of the folded pieces of paper.

10. The apparatus of claim 7, wherein said step of forming the inserts further comprises the steps of longitudinally, continuously folding said pieces of paper to form said inserts, said overlaminate being applied over the folded pieces of paper to form said sandwiched structure.

11. The apparatus of claim 7, wherein said inserts are assembled against the side of said overwrap which faces inwardly against said packages when said packages are wrapped with said overwrap, such that each of said inserts is secured between said overwrap and each of said inserts cannot be removed until said overwrap is removed.

12. A method of forming an overwrap web provided with inserts, said method comprising the steps of:

forming inserts, said step of forming inserts including applying an overlaminate over spaced apart pieces of paper to form a sandwiched structure and cutting said formed inserts out of said sandwiched structure, said formed inserts each comprising one of said pieces of paper covered with a piece of said overlaminate, said inserts being spaced from one another;

advancing said inserts in a first direction;

advancing a film overwrap in a second direction; and assembling said inserts against said overwrap with an appropriate spacing between said inserts to form an overwrap web provided with inserts.

* * * * *